US012406220B2

(12) United States Patent
DeSimone et al.

(10) Patent No.: US 12,406,220 B2
(45) Date of Patent: Sep. 2, 2025

(54) METHODS AND SYSTEMS FOR IMPROVING VEHICLE SEARCHES

(71) Applicant: CONSTELLATION ENERGY GENERATION, LLC, Kennett Square, PA (US)

(72) Inventors: Samuel DeSimone, Kennett Square, PA (US); Dennis Shaulis, Kennett Square, PA (US)

(73) Assignee: Constellation Energy Generation, LLC, Kennett Square, PA (US)

( * ) Notice: Subject to any disclaimer, the term of this patent is extended or adjusted under 35 U.S.C. 154(b) by 311 days.

(21) Appl. No.: 16/227,780

(22) Filed: Dec. 20, 2018

(65) Prior Publication Data
US 2019/0188638 A1  Jun. 20, 2019

Related U.S. Application Data

(60) Provisional application No. 62/608,437, filed on Dec. 20, 2017.

(51) Int. Cl.
*G06Q 10/0833* (2023.01)
*G06Q 10/0832* (2023.01)
(Continued)

(52) U.S. Cl.
CPC ..... *G06Q 10/0833* (2013.01); *G06Q 10/0832* (2013.01); *G06Q 10/0875* (2013.01); *G08G 1/205* (2013.01)

(58) Field of Classification Search
CPC .. G06Q 10/083; G06Q 10/08; G06Q 10/0832; G06Q 10/0833; G06Q 10/0853;
(Continued)

(56) References Cited

U.S. PATENT DOCUMENTS 5,761,086 A     6/1998  Cranford, III
6,492,912 B1 * 12/2002  Jones ................. G08G 1/123
                                              340/988
(Continued)

FOREIGN PATENT DOCUMENTS

AU   2012101082 B4    5/2013
AU   2009265060 B2   12/2013
EP      0823118 B1   11/2000

OTHER PUBLICATIONS

Nuclear Regulatory Commission 10 CFR § 73.55 Requirements for physical protection of licensed activities in nuclear power reactors against radiological sabotage. (Year: 2012).*

(Continued)

Primary Examiner — Emmett K. Walsh
(74) Attorney, Agent, or Firm — Ballard Spahr LLP

(57) ABSTRACT

An example method can comprise receiving an indication of a scheduled delivery at a remote computing device and from a first device. The indication of the scheduled delivery can comprise one or more delivery parameters. A delivery schedule comprising the indication of the scheduled delivery can be transmitted from the remote computing device to a second device. A delivery update adjusting one or more of the delivery parameters can be received from a third device, and the delivery schedule can be updated based on the received delivery update. The updated delivery schedule can be transmitted to the second device. One or more security actions can be performed on a delivery vehicle based at least in part on the updated delivery schedule.

19 Claims, 11 Drawing Sheets

(51) Int. Cl.
*G06Q 10/0875* (2023.01)
*G08G 1/00* (2006.01)

(58) Field of Classification Search
CPC ... G06Q 10/0837; G06Q 10/0838; G08G 1/20
See application file for complete search history.

(56) References Cited

U.S. PATENT DOCUMENTS

| | | | |
|---|---|---|---|
| 9,033,116 B2 | 5/2015 | Breed | |
| 9,069,101 B2 | 6/2015 | Arroyo, Jr. et al. | |
| 2007/0001854 A1* | 1/2007 | Chung | G08B 13/2417 340/572.1 |
| 2011/0054979 A1* | 3/2011 | Cova | G06Q 10/06 705/7.37 |
| 2013/0015970 A1 | 1/2013 | Steer | |
| 2016/0026973 A1* | 1/2016 | Chen | G06Q 10/083 705/331 |
| 2016/0042321 A1 | 2/2016 | Held | |
| 2016/0082925 A1* | 3/2016 | Arocha | B60R 25/34 340/426.24 |
| 2017/0103683 A1 | 4/2017 | Yazdi et al. | |
| 2017/0154347 A1* | 6/2017 | Bateman | G06Q 50/28 |
| 2017/0286892 A1 | 10/2017 | Studnicka | |
| 2017/0309087 A1 | 10/2017 | Allen | |
| 2017/0316370 A1 | 11/2017 | Putcha et al. | |
| 2018/0038805 A1* | 2/2018 | Heikkilä | G01S 17/06 |
| 2018/0060808 A1* | 3/2018 | Borgerson | G06Q 40/04 |
| 2018/0089622 A1* | 3/2018 | Burch, V | B64U 50/19 |
| 2019/0266652 A1* | 8/2019 | Bonner | G06Q 30/0625 |

OTHER PUBLICATIONS

Sukumar, Sreenivas Rangan, et al. "Under Vehicle Inspection with 3d Imaging: Safety and Security for Check-Point and Gate-Entry Inspections." 3D imaging for safety and security (2007): 249-278. (Year: 2007)*

International Search Report and Written Opinion mailed on Mar. 5, 2019 by the International Searching Authority for Patent Application No. PCT/US2018/066771, which was filed on Dec. 20, 2018 (Inventor—DeSimone et al.; Applicant—Exelon Generation Company, LLC; (15 pages).

* cited by examiner

METHODS AND SYSTEMS FOR IMPROVING VEHICLE SEARCHES

CROSS REFERENCE TO RELATED PATENT APPLICATION

This application claims priority to U.S. Provisional Application No. 62/608,437 filed Dec. 20, 2017, herein incorporated by reference in its entirety.

BACKGROUND

Vehicle searches in restricted or high security areas, such as power plants, are a source of delay for delivering cargo as well as added cost for the recipient of the cargo to be delivered. Delays in search cost the recipient a substantial sum of money. The searches also require additional staffing of checkpoints by officers qualified to conduct the cargo searches. Additionally, searches of cargo deliveries take a significant amount of time, with officers required to manually enter information into arrival logs and communicate various information from one checkpoint to another. These and other shortcomings are addressed in the present application.

SUMMARY

It is to be understood that both the following general description and the following detailed description are exemplary and explanatory only and are not restrictive. Provided are methods and systems for improving vehicle search.

In a first aspect, a method can comprise receiving an indication of a scheduled delivery at a remote computing device and from a first device. The indication of the scheduled delivery can comprise one or more delivery parameters. a delivery schedule comprising the indication of the scheduled delivery can be transmitted from the remote computing device to a second device. A delivery update adjusting one or more of the delivery parameters can be received from a third device, and the delivery schedule can be updated based on the received delivery update. The updated delivery schedule can be transmitted to the second computing device. One or more security actions can be performed on a delivery vehicle based at least in part on the updated delivery schedule.

In a second aspect, a method can comprise receiving an indication of a scheduled delivery at a remote computing device and from a first device. The indication of the scheduled delivery can comprise information regarding one or more tamper indicating devices affixed to a delivery vehicle. At least the information regarding the one or more tamper indicating devices affixed to the delivery vehicle can be transmitted to a second device. It can be verified that each of the tamper indicating devices affixed to the delivery vehicle matches the received information regarding the one or more tamper indicating devices affixed to the delivery vehicle. One or more security actions can be performed on a delivery vehicle based at least in part on verifying that each of the tamper indicating devices affixed to the delivery vehicle matches the received information regarding the one or more tamper indicating devices affixed to the delivery vehicle.

In a third aspect, an apparatus can comprise one or more processors and a memory having embodied thereon processor executable instructions. When executed by the one or more processors, the processor executable instructions cause the apparatus to receive an indication of a scheduled delivery at a remote computing device and from a first device. The indication of the scheduled delivery can comprise one or more delivery parameters. A delivery schedule comprising the indication of the scheduled delivery can be transmitted from the remote computing device to a first device. A delivery update adjusting one or more of the delivery parameters can be received from the first device, and the delivery schedule can be updated based on the received delivery update. The updated delivery schedule can be transmitted to the second computing device. One or more security actions can be performed on a delivery vehicle based at least in part on the updated delivery schedule.

In a fourth aspect, a method can comprise receiving, at a first device, an indication that a delivery vehicle has arrived at a checkpoint. One or more security actions can be performed on the delivery vehicle in response to the indication that the delivery vehicle has arrived. An indication of the one or more security actions performed on the delivery vehicle and one or more delivery parameters can be transmitted to one or more additional devices.

In a fifth aspect, a method can comprise causing performance of a first security action at a first location. An indication that the first security action is being performed can be received from a first device at the first location. Based on the indication that the first security action is being performed, a second security action can further be performed at a second location. An indication that the first security action is complete can be received from the first device. A second device at the second location can be notified that the first security action is complete.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
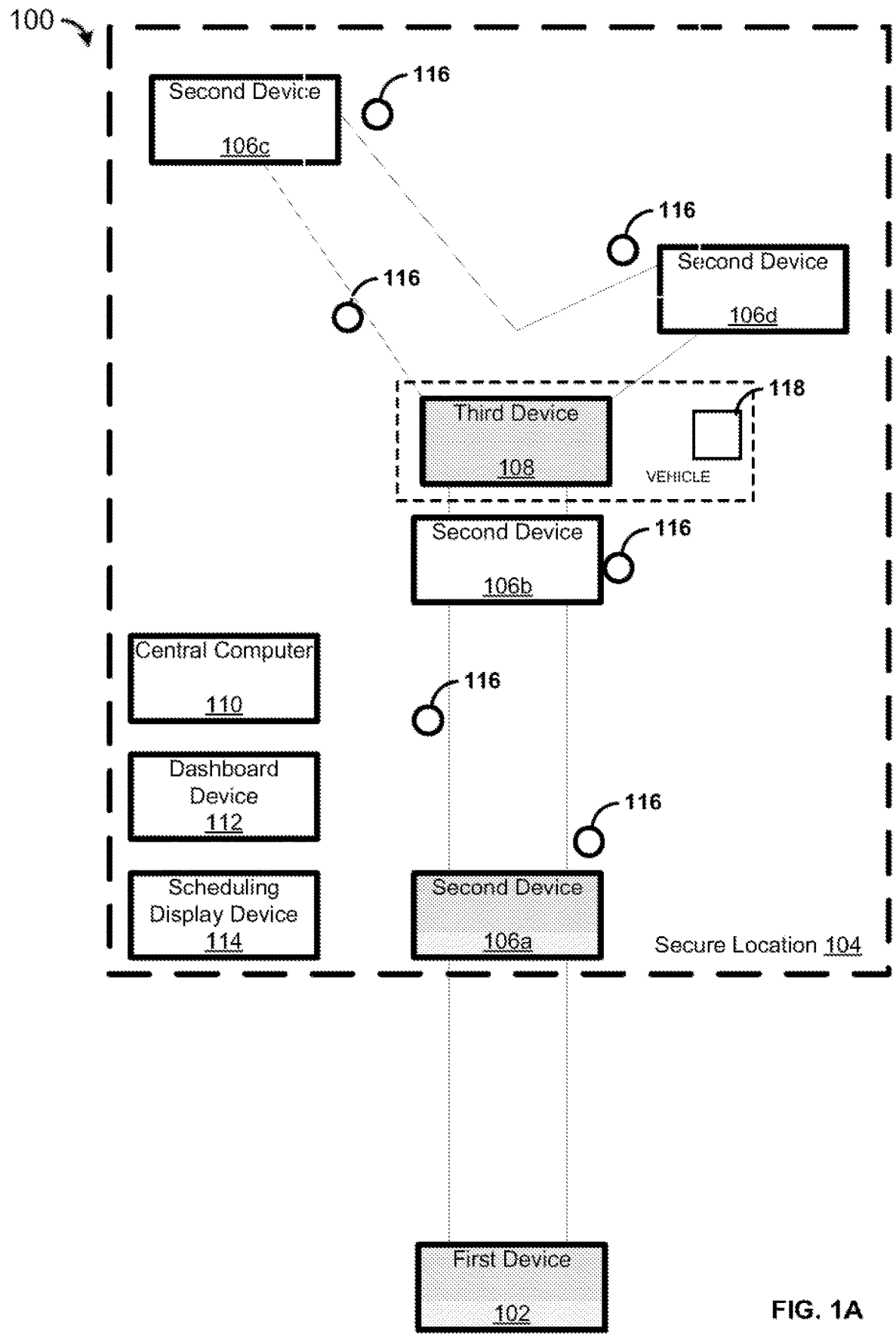
FIG. 1A is an example system for improving delivery vehicle search.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for improving vehicle search. In particular, information regarding one or more scheduled arrivals at the secure area can be captured at a remote location (e.g., a location where the vehicle and/or its cargo and cargo containers are sealed or otherwise secured). The information can be transmitted to a device capable of generating a vehicle arrival schedule for the secured area. Additionally, a device maintained by a driver of the vehicle can provide updates to an anticipated arrival time at the secure location. This anticipated arrival information can allow the secure location to more efficiently staff any checkpoints and delivery sites based on arrival of vehicles needing to be searched and/or unloaded.

Alternatively, when an unscheduled vehicle arrives at the secured location, an officer can create a log entry indicating arrival of the vehicle and detailing any search procedures conducted. This can be transmitted to other officers at locations within the secure location through which the vehicle will pass, such as additional checkpoints and/or the ultimate delivery site of the vehicle. This can provide some advance notice of the vehicle to the delivery site, allowing for staff to prepare for the delivery. It can also help to move the vehicle efficiently through each checkpoint, reducing need to re-search the delivery vehicle.

Additionally, devices worn or otherwise carried by officers present at the secure location can aid officers in conducting searches of the vehicle once it arrives. For example, the devices carried by the officers can provide indicia (e.g., visual or auditory cues) of a search procedure approved by the secure location. This can help reduce human error in conducting searches. Still further, the information received can comprise information related to one or more tamper indicating devices present on the delivery vehicle, such as device serial numbers, devices photographs, and the like. This can aid officers at the secure location in assessing the security of the vehicle, FIG. 1A is a block diagram illustrating various aspects of an exemplary system 100 in which the present methods and systems can operate. One skilled in the art will appreciate that provided herein is a functional description and that the respective functions can be performed by software, hardware, or a combination of software and hardware.

In an aspect, the system 100 can comprise a first device 102 located remote from a secure location 104. The first device 102 can be operated, for example, by an officer qualified to seal cargo or other deliverables for transportation. In some aspects, the first device 102 can comprise a wearable computer, tablet computer, smartphone, smart watch or other smart device. Additionally, the first device 102 can comprise an interface, such as a display (e.g., touch screen display). The display can be configured to display content, security information, vehicle information, task information, and other data to a user (e.g., officer). The display can be configured to receive interactions from the user.

The system 100 can further comprise one or more second devices 106. Each of the one or more second devices 106 can be located within the secure location 104. Each of the second devices 106 can be operated by an officer, such as an officer authorized to conduct search of a vehicle (e.g., any vehicle seeking access to the secure location 104). In some aspects, each of the one or more second devices 106 can be associated with a particular site within the secure location 104. In some aspects, each of the one or more second devices 106 can comprise a wearable computer, tablet computer, smartphone, smart watch or other smart device. Additionally, the one or more second devices 106 can comprise an interface, such as a display (e.g., touch screen display). The display can be configured to display content, security information, vehicle information, task information, and other data to a user (e.g., officer). The display can be configured to receive interactions from the user.

As shown in FIG. 1A, the one or more second devices 106 can comprise a second device 106a at an entrance to the secure location 104, a second device 106b at a first checkpoint within the secure location 104, a second device 106c at a first delivery site within the secure location 104, and a second device 106d at a second delivery site within the secure location 104. However, it will be appreciated that more (or fewer) second devices 106 can be included without departing from the scope of the method.

The system 100 can further comprise a third device 108. The third device 106 can be associated with a driver and/or a delivery vehicle assigned to deliver cargo to the secure location 104. In some aspects, the third device 108 can comprise a Global Positioning System (GPS) antenna capable of determining a location of the third device. In some aspects, the third device can comprise a wearable computer, tablet computer, smartphone, smart watch or other smart device.

The system 100 can further comprise a central computer 110. The central computer can be in communication with each of the first device 102, the one or more second devices 106, and the third device 108. In some aspects, the central computer 110 can comprise a data repository, such as a database or other data structure, to retain data from the first device 102, the one or more second devices 106, and/or the third device 108. In some aspects, the central computer 110 can be disposed at the secure location 104. In other aspects, the central computer 110 can be disposed remotely relative to the secure location 104.

The system 100 can further comprise a dashboard device 112. The dashboard device 112 can provide a user (e.g., supervisor) with a status at each checkpoint (e.g., at each of the second devices 106). The dashboard device 112 can further allow the user to track the progress of one or more vehicles through the secure location 104. In some aspects, the dashboard device 112 can comprise a wearable computer, tablet computer, smartphone, smart watch or other smart device. In some aspects, one or more of the second devices 106 can act as the dashboard device 112. In some aspects, the central computer 110 can act as the dashboard device 112.

The system 100 can further comprise a scheduling display device 114. The scheduling display device can provide one or more users with scheduling information related to work assignments (e.g., a command center). In some aspects, the scheduling display device 114 can further display the progress of one or more vehicles through the secure location 104. In some aspects, the scheduling information can be determined based on the status of the one or more vehicles. For example, if there are no vehicles approaching a worker's assigned area, the worker can be reassigned to an area to which a vehicle is approaching.

The first device 102, the one or more second devices 106, the third device 108, and the central computer 110 can have wired and/or wireless data transmission capabilities. For example, the first device 102, the one or more second devices 106, the third device 108, and the central computer 110 can communicate via a network, such as a local area network and/or the Internet via standards such as IEEE 802.3 for wired communications and IEEE 802.11 and/or 802.15 for wireless communication.

In some aspects, the central computer 110 can receive an indication of a scheduled delivery. The indication of the delivery can be received from the first device 102. The indication of the scheduled delivery can comprise one or more delivery parameters. The delivery parameters can comprise information related to the scheduled delivery. As non-limiting examples, the one or more delivery parameters can comprise a scheduled delivery time, information regarding a scheduled delivery vehicle, information regarding a scheduled delivery driver, information regarding a delivery work order, one or more photos of a delivery vehicle, or one or more photos of cargo to be delivered. In other aspects, the one or more delivery parameters can comprise information regarding one or more tamper indicating devices installed on a delivery vehicle.

The central computer 110 can create a delivery schedule based on the received indication of the scheduled delivery. In some aspects, the computing device 110 can further transmit the delivery schedule comprising the indication of the scheduled delivery to at least one of the one or more second devices 106. In some aspects, the delivery schedule can help to facilitate staffing of one or more sites within the secured area, based on deliveries scheduled to each of the one or more sites. Each of the one or more second devices 106 can be used to output the delivery schedule. For example, the delivery schedule can be displayed on a screen or otherwise presented to a user.

The central computer 110 further receives, from the third device 108, a delivery update adjusting one or more of the delivery parameters. In an aspect, the delivery update can comprise an updated estimated delivery time. For example, the updated estimated delivery time can be received from the third device based at least in part on location information of the third device and/or drive time estimates from the delivery driver.

The central computer 110 can update the delivery schedule based on the received delivery update. For example, a new estimated delivery time can be received, and the delivery schedule can be revised to reflect the new delivery time. In some aspects, the second device 106 at the secure location 104 can display the updated delivery schedule in response to receiving the updated delivery schedule. The central computer 110 further transmits the updated delivery schedule to the at least one of the one or more second devices 106. The at least one of the one or more second devices 106.

The central computer 110 can cause one or more security actions to be performed on a delivery vehicle based at least in part on the updated delivery schedule. In some aspects, the one or more security actions can be determined based on one or more tamper indicating devices on the delivery vehicle matching the information regarding the one or more tamper indicating devices received as part of the delivery schedule (e.g., in the delivery parameters).

In some aspects, causing the one or more security actions to be performed can comprise completing a checklist of activities mandated by the secure location 104. For example, the central computer 110 can cause the second device 106 to output indicia of the one or more security actions. The indicia can comprise visual and/or auditory cues for a trained officer, directing the officer in completion of the one or more security actions. As a particular example, the checklist can comprise a list of activities that satisfy regulations such as 10 CFR 73.55, Nuclear Regulatory Commission guidelines, internal guidelines, and/or the like.

In some aspects, in response to performance of the one or more security actions, the second device 106 at the secure location 104 can transmit an indication that one or more security actions have been performed on the delivery vehicle to one or more additional devices (e.g., others of the one or more second devices 106). For example, the second device 106a at an entrance to the secure location can transmit vehicle information and information regarding completed search procedures to additional devices at checkpoints through which the delivery vehicle will cross (e.g., second device 106b) and/or final delivery sites for the delivery vehicle (e.g., second device 106d).

In an aspect, one or more access points 116 can be distributed throughout the secure location 104. For example, as shown in FIG. 1A, the access points 116 can be disposed at various locations along roads within the secure location 104. The system 100 can further comprise one or more beacon devices 118. The beacon devices 118 can be temporarily mountable on an arriving vehicle, such as by magnets, temporary adhesive, clamps, static cling, and/or the like. In some aspects, each of the beacon devices 118 can be in communication with one or more of the access points 116. Communication methods such as radio frequency transceivers, passive integrated transponders, personal area networks, and/or the like can be used to effect communication between one of the one or more beacon devices 118 and one of the one or more access points 116.

In an aspect, one or both of the central computer 110 and/or the scheduling display device 114 can monitor and/or store some or all interactions within the system 100. Monitoring of the interactions within the system can provide useful analytics information regarding an amount of time required to complete each interaction. For example, a security officer can interact with one of the second devices 106 to indicate commencement of a particular activity. The security officer can further interact with the one of the second security device 106 to indicate completion of the particular activity. In this way, the central computer 110 and/or the display device 114 can receive information regarding time required to complete the particular activity. In some aspects, the information regarding time required to complete the activities can be stored and aggregated. For example, the information can be aggregated based on one or more of the particular activity, the security officer associated with the activity, the location at which the particular activity is performed, and/or the like.

As another example, the central computer 110 and/or the display device 114 can monitor one or more properties of the first device 102, the one or more second devices 106, and/or the third device 108. As a particular example, the central computer 110 can monitor a location of the third device 108. Based at least in part on the location of the third device 108, the central computer can determine an estimated time of arrival of the third device at the secure location 104. As another example, the central computer 110 can monitor activities (e.g., security activities) being performed by the one or more second devices 106. Based at least in part on the security actions being performed by the one or more second devices 106, historical information regarding a length of time required to complete similar security actions, and/or a schedule of arriving vehicles, the central computer 110 can estimate a time at which the vehicle associated with the third device 108 can be estimated. In some aspects, the central computer 110 can communicate the estimated arrival time to one or more of the second devices 110, the dashboard device 112, and the scheduling display device 114. The central computer 110 can also communicate the estimated wait time to the third device 108.

Figure 1B:
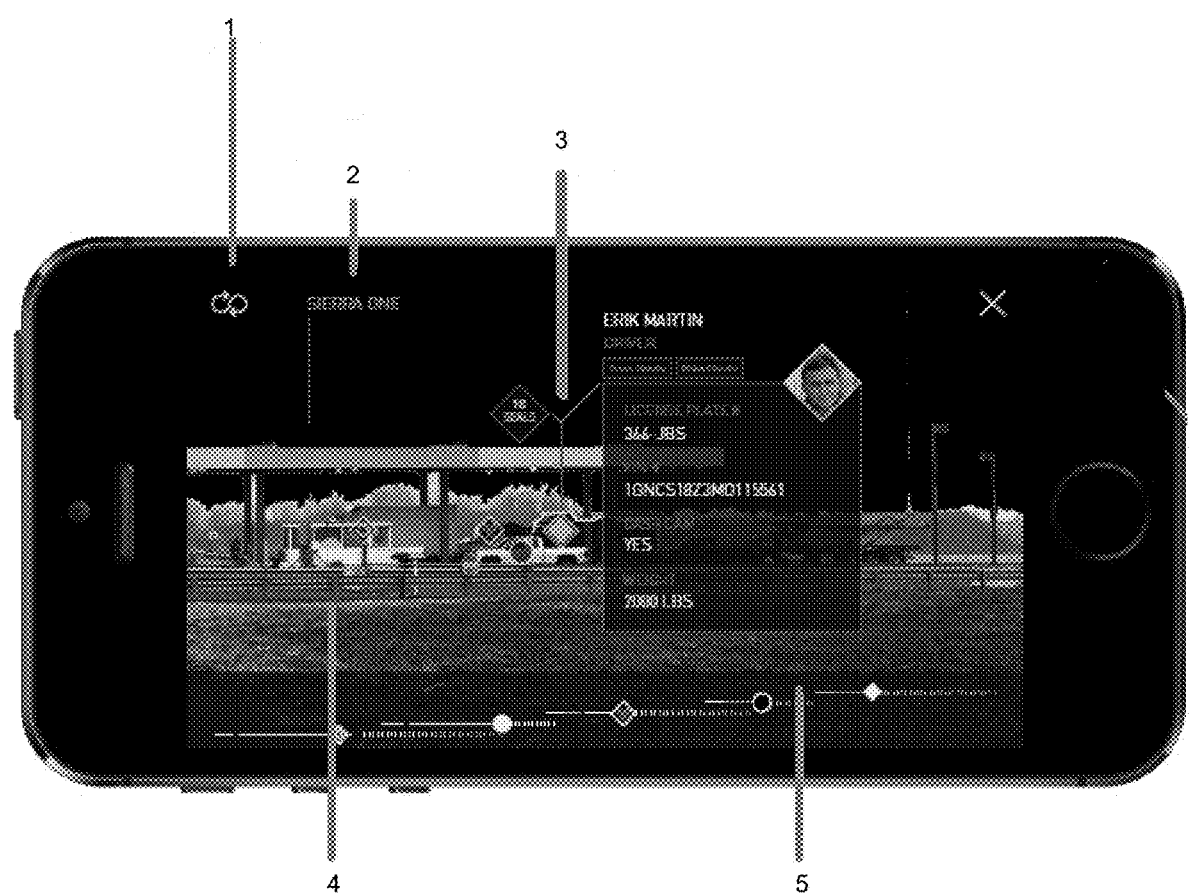
FIG. 1B is an example augmented reality overlay.

In some aspects, one or more of the second devices 106 can comprise a camera. The second device 106 can provide an augmented reality overlay providing data related to the image currently being captured by the camera. An example of the augmented reality overlay is shown in FIG. 1B. The augmented reality overlay comprises a soft button 1 used to swap between the augmented realty view and one or more additional functions (e.g., an ID scanner or the like). The overlay can further comprise an indicator 2 indicating a physical location captured by the camera. The indicator can comprise, for example, a location name, a longitude and latitude, and/or the like.

In some aspects, the augmented reality overlay can further comprise information 3 regarding a vehicle captured by the camera. In particular, the information 3 can comprise for example, information identifying the vehicle (e.g., license plate number, VIN number, and/or the like), information identifying a driver of the vehicle (e.g., driver name, driver photograph, and/or the like), physical characteristics of the vehicle (e.g., vehicle weight, size, and/or the like), and one or more security features of the vehicle. The augmented reality overlay can further comprise one or more icons 4 indicating one or more additional vehicles waiting at a checkpoint captured in the camera and a timeline 5 indicating expected times for processing of the one or more vehicles.

Figure 2:
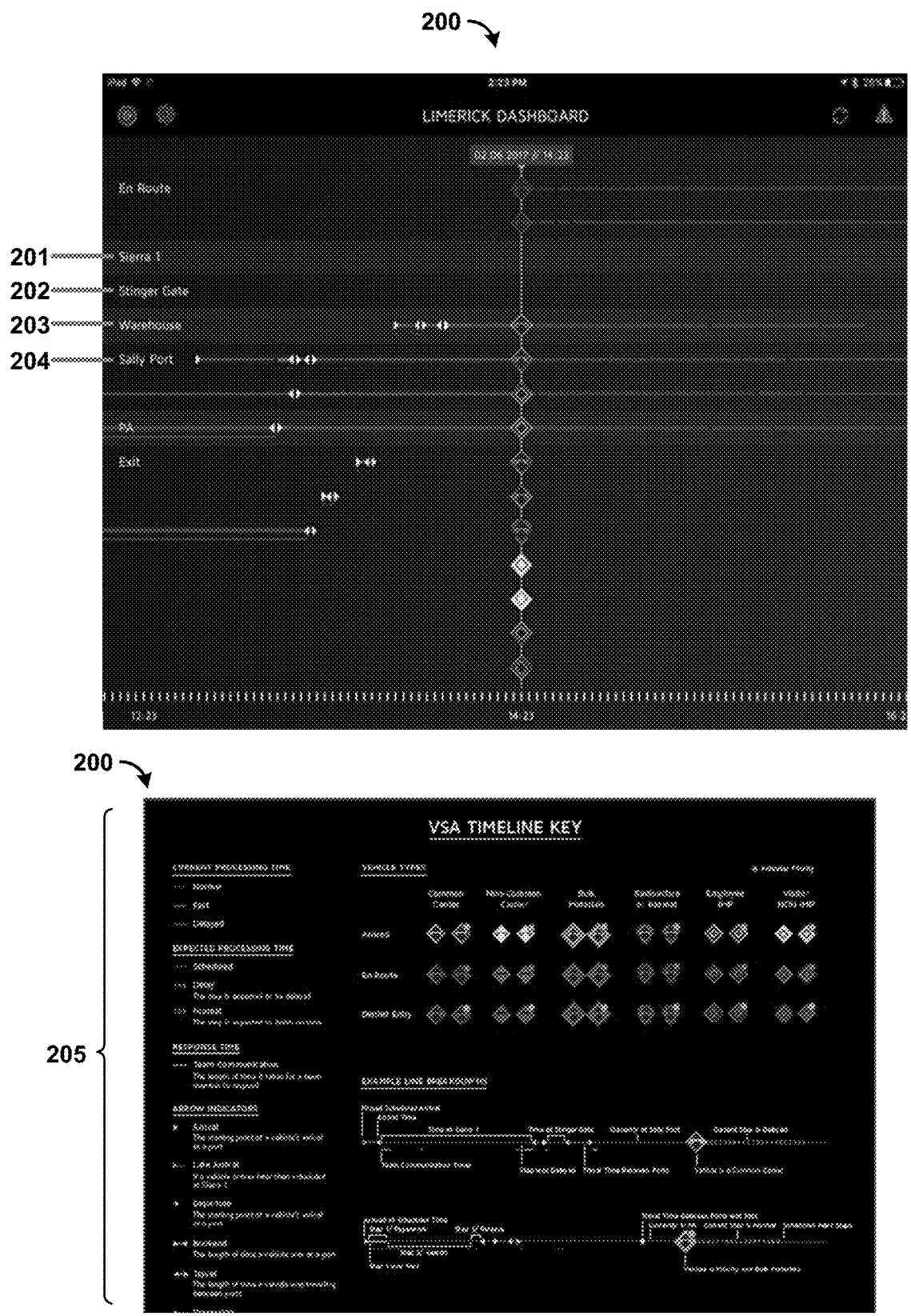
FIG. 2 is an example of a user interface.

FIG. 2 shows an interface 200 configured with a device, such as the dashboard device 112, the first device 102, the second device 106, or any other device, for example. The interface 200 can provide a user (e.g., a supervisor) with information regarding the progress of one or more vehicles through one or more secure locations, such as the secure location 104, for example. The interface 200 can provide visual representation information of the progress of one or more vehicles through one or more secure locations indicated by 201, 202, 203, and 204. For example, the interface 200 can indicate whether a time/duration associated with processing the one or more vehicles through the one or more secure locations indicated by 201, 202, 203, and 204 is normal, fast, or delayed. Additional information can be indicated by the interface 200 such as a vehicle type, vehicle status, or the like. The interface 200 can comprise a legend 205 that details what various visual indicators represent on the interface 200.

Figure 3:
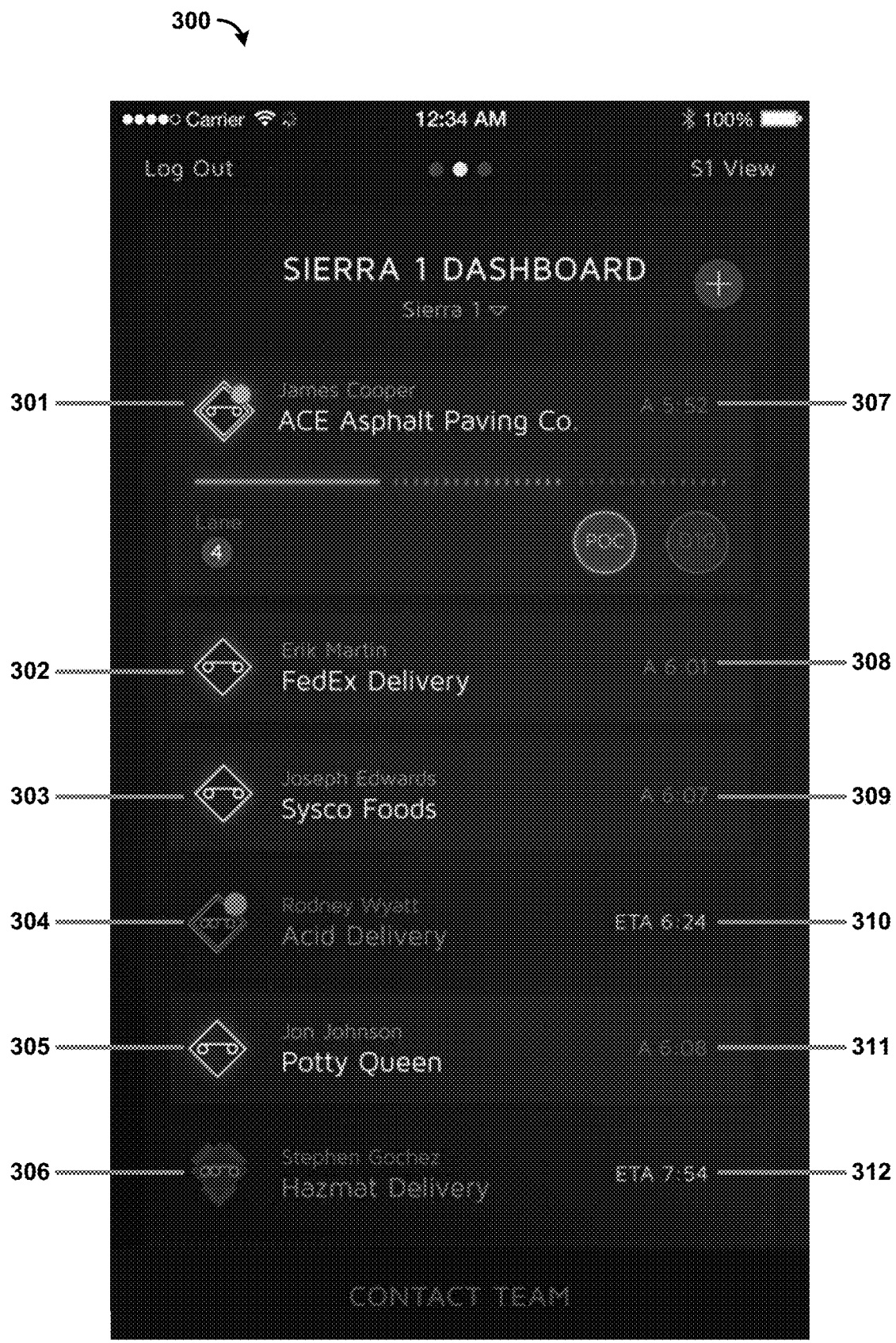
FIG. 3 is an example of a user interface.

FIG. 3 shows an interface, such as dashboard interface configured with the dashboard device 112. The dashboard interface 300 can provide a user (e.g., a supervisor) with a plurality of statuses 301, 302, 303, 304, 305, and 306 associated with a plurality of checkpoints (e.g., a plurality of second devices 106). The dashboard interface 300 can allow the user to track the progress of one or more vehicles through a secure location, such as the secure location 104, for example. The user can view an estimated arrival time 307, 308, 309, 310, 311, and 312, associated with the vehicles arriving at the checkpoints based on the statuses 301, 302, 303, 304, 305, and 306, respectively. For example, the status 301 can indicate that a vehicle driven by James Cooper for Ace Asphalt Paving Company is arriving at a checkpoint with an arrival time 307 of 5:52 PM.

Figure 4:
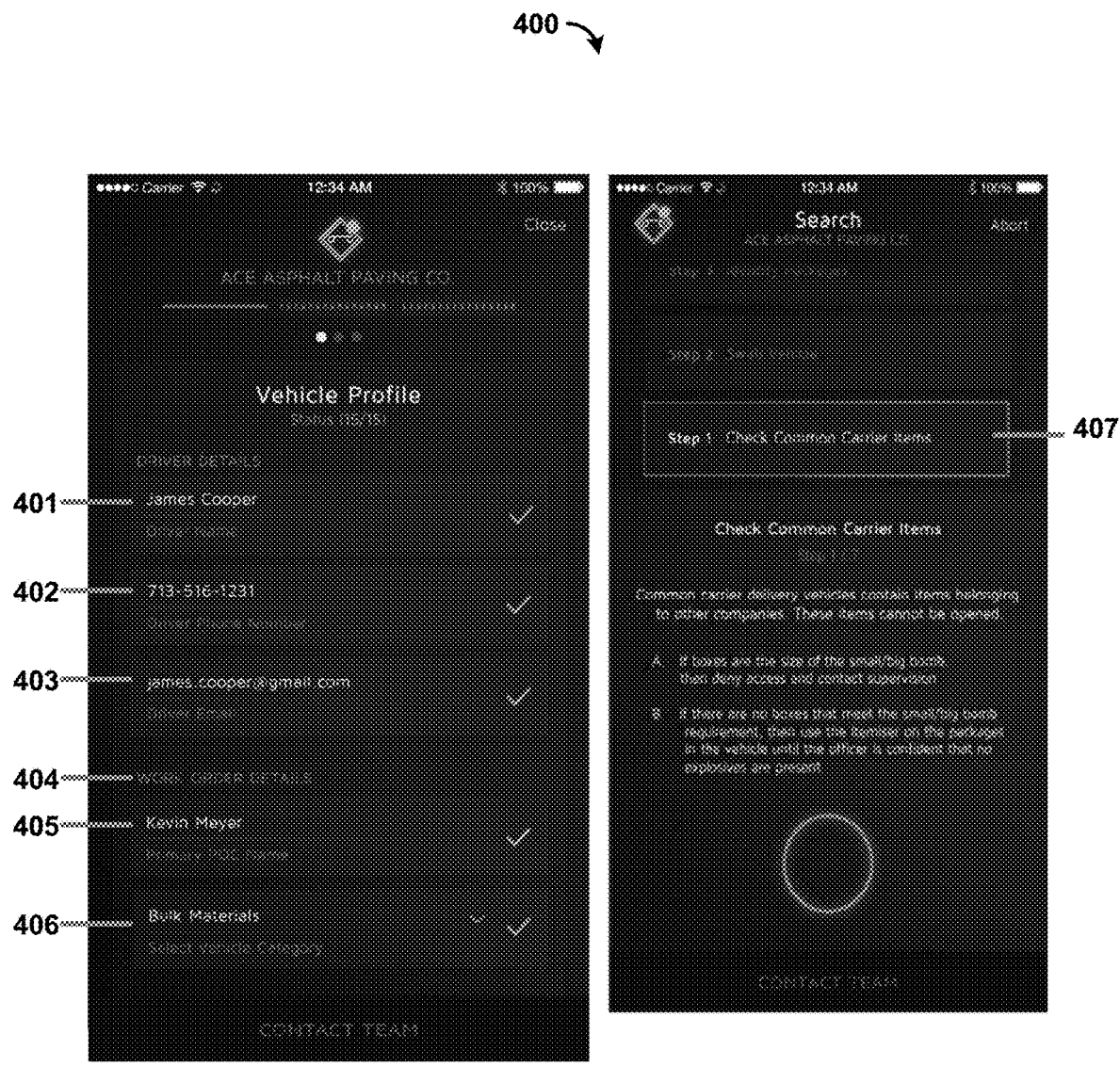
FIG. 4 is an example of a user interface.

FIG. 4 shows an interface, such as dashboard interface configured with the dashboard device 112. The dashboard interface 400 can provide a user (e.g., a supervisor) with information associated with a vehicle arriving at a checkpoint (e.g., a second device 106). The vehicle arriving at the checkpoint can be indicated by a status 301, from the dashboard interface 300. The dashboard interface 400 can provide the user with information associated with the vehicle arriving at the checkpoint such as a name of the driver 401, a phone number associated with the driver 402, and an email address associated with the driver 403. The dashboard interface 400 can provide the user with additional information such as work order details information 404 that includes a point of contact 405, and a vehicle category 406. The work order details information 404 can also comprise work order instructions that are displayed to the user via the dashboard interface 400. The work order details information 404 that is displayed to the user via the dashboard interface 400 can be displayed to the user based on user interaction with the dashboard interface 400. When the user scrolls down on the screen of the dashboard interface 400, steps associated with the work order details information 404 can be displayed to the user. For example, step 1 (407) can inform the user to check common carrier items on the vehicle. The work order details information 404 and/or the dashboard interface 300 can comprise additional information.

Figure 5:
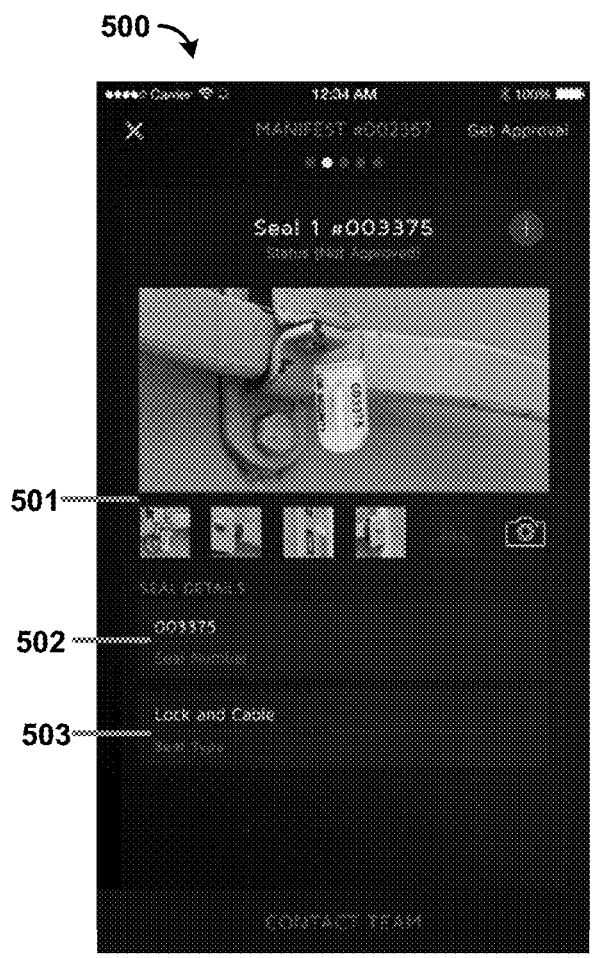
FIG. 5 is an example of a user interface.

FIG. 5 shows an interface configured with a device, such as the dashboard device 112, a first device 102, a second device 106, for example. The interface 500 can provide a user (e.g., a supervisor) with information associated with a vehicle arriving at a location and/or checkpoint (e.g., a first device 102, a second device 106) such as information regarding one or more tamper indicating devices affixed to a delivery vehicle. For example, interface 500 can comprise one or more photos 501 of a tamper indicating device. The interface 500 can comprise additional information associated with the tamper indicating device such as a seal number 502 and a seal type 503. The interface 500 can comprise any other additional information.

Figure 6:
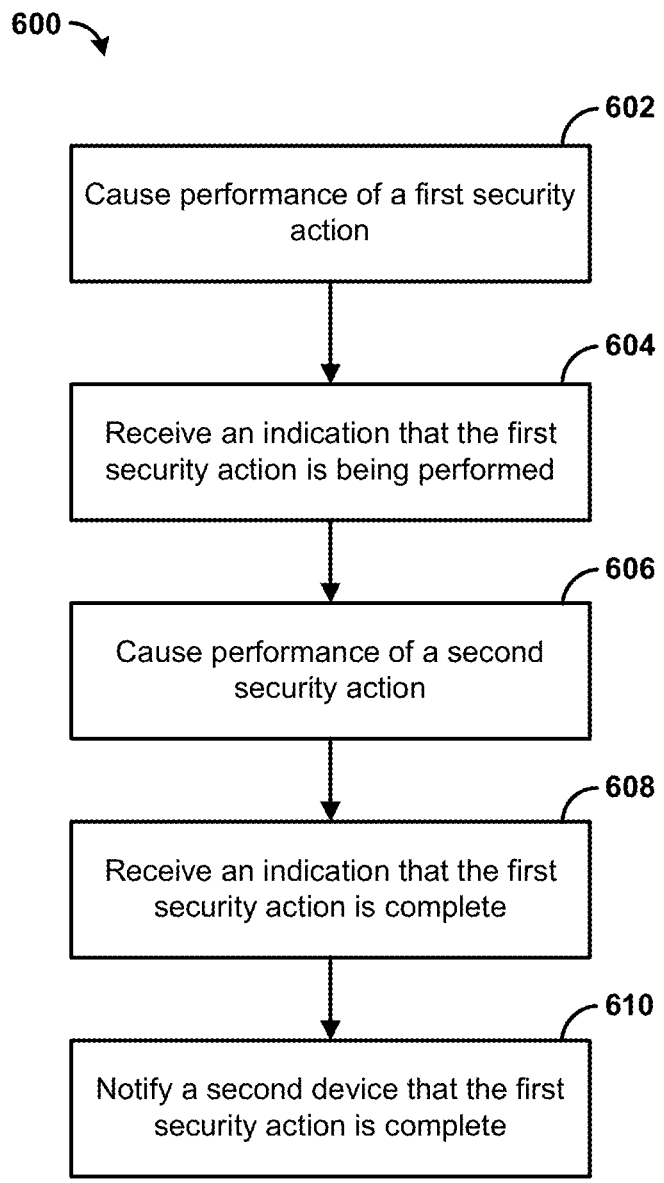
FIG. 6 is a flowchart of an example method.

FIG. 6 shows a method 600 for triggering action based on activity of security devices. At step 602, a computing device (e.g., the central computer 110) can cause performance of a first security action at a first location. In some aspects, the first security action can comprise one or more actions to be performed by a security guard. In some aspects, the first security action can be based at least in part on a schedule and arrival of a vehicle (e.g., a delivery vehicle, a utility vehicle, a vehicle associated with a visitor, a vehicle associated with an employee, or any other vehicle attempting to enter the secured location for any reason). In some aspects, the first security action can be determined based on one or more tamper indicating devices on the vehicle matching information regarding the one or more tamper indicating devices received as part of the schedule (e.g., in delivery parameters).

In some aspects, causing the first security action to be performed can comprise completing a checklist of activities mandated by the secure location. For example, the computing device can cause the device at the first location (e.g. one of the second device 106) to output indicia of the activities mandated by the first location security checkpoint. The indicia can comprise visual and/or auditory cues for a trained officer, directing the officer in completion of the one or more activities. As a particular example, the checklist can comprise a list of activities that satisfy regulations such as 10 CFR 73.55, nuclear regulatory commission guidelines, internal guidelines, and/or the like.

At step 604, the computing device can receive, from a device at the first location, an indication that the first security action is being performed. The indication can comprise any indicia that would indicate that the first security action is in process, such as activation of a user interface element, interaction with a button on the device, reception of a voice command via a microphone, and/or the like. In some aspects, the indication that the first device is performing the first security action can be represented by circling the indicia on the display, altering a color of the font in which the indicia is displayed, or otherwise highlighting the first security action.

In some aspects, in response to receiving the indication that the first security action is being performed, the computing device can cause a third device (e.g., the dashboard device 112) to display an indication that the first security action is in progress on a vehicle in the first location. The third device can display, for example, a status of the checkpoint, an estimated time remaining to complete the first security action at the checkpoint, an indication of how long the first security action has been in progress, and/or the like.

At step 606, the computing device can cause performance of a second security action at a second location. In some aspects, performance of the second security action can be based on receipt of the indication that the first security action is being performed in step 604. In some aspects, the second security action can comprise one or more actions to be performed by a security guard. In some aspects, the second security action can be based at least in part on a delivery schedule and arrival of a delivery vehicle. In some aspects, the second security action can be based, at least in part, on the first security action. As a particular example, the second security action can comprise observing as the trained security officer performs the first security action.

In some aspects, causing the second security action to be performed can comprise completing a checklist of activities mandated by the secure location. For example, the computing device can cause the device at the second location (e.g. one of the second device 106) to output indicia of the activities mandated by the second location security checkpoint. In some aspects, the computing device can cause the device at the second location to output indicia of the activities to be performed at the first location security checkpoint (e.g., the first security action). The indicia can comprise visual and/or auditory cues for a trained officer, directing the officer in completion of the one or more activities. As a particular example, the checklist can comprise a list of activities that satisfy regulations such as 10

CFR 73.55, Nuclear Regulatory Commission guidelines, internal guidelines, and/or the like.

At step 608, the computing device can receive an indication that the first security action is complete. In some aspects, the indication that the first security action is complete can be received from the first device at the first location. The indication that the first security action is complete can comprise any indicia that would indicate that the first security action is complete, such as activation of a user interface element, interaction with a button on the device, reception of a voice command via a microphone, and/or the like. In some aspects, the indication that the first security action is complete can be represented by slashing or otherwise crossing out the indicia on the display, altering a color of the font in which the indicia is displayed, or otherwise highlighting the first security action.

In some aspects, in response to receiving the indication that the first security action is complete, the computing device can cause the device at the first location to perform a third security action. In some aspects, the third security action can be based at least in part on a delivery schedule and arrival of a delivery vehicle. In some aspects, the third security action can be determined based on one or more tamper indicating devices on the delivery vehicle matching information regarding the one or more tamper indicating devices received as part of the delivery schedule (e.g., in delivery parameters). In some aspects, the third security action can be based in part on one or more of the first security action and the second security action.

At step 610, the computing device can notify the device at the second location that the first security action is complete. In some aspects, the notification can comprise causing output of indicia that the first security action is complete. The indicia can comprise visual and/or auditory cues for a trained officer. The method 500 can be repeated for any number of tasks, including simultaneous tasks.

Figure 7:
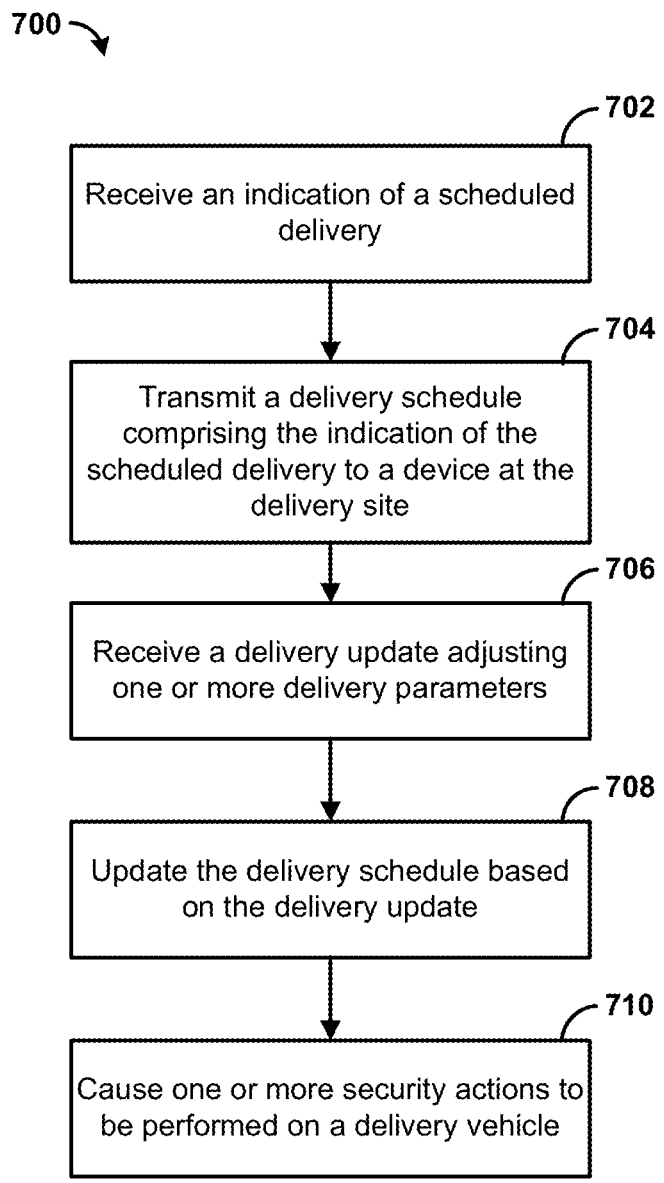
FIG. 7 is a flowchart of an example method.

FIG. 7 shows a method 600 for improving delivery search. At step 702, a computing device (e.g., the central computer 110) can receive an indication of a scheduled delivery. The indication can be received, for example, from a device used to seal the delivery vehicle and/or its cargo for delivery (e.g., the first device 102) and/or a device associated with the delivery driver or the delivery vehicle (e.g., the third device 108). In some aspects, the indication of the scheduled delivery can comprise one or more delivery parameters. The delivery parameters can comprise information related to the scheduled delivery. As non-limiting examples, the one or more delivery parameters can comprise a scheduled delivery time, information regarding a scheduled delivery vehicle, information regarding a scheduled delivery driver, information regarding a delivery work order, one or more photos of a delivery vehicle, or one or more photos of cargo to be delivered. In other aspects, the one or more delivery parameters can comprise information regarding one or more tamper indicating devices installed on a delivery vehicle.

In some aspects, the computing device can transmit, to the device used to seal the delivery vehicle and/or its cargo, one or more guidelines for use in sealing the delivery vehicle and/or its cargo. For example, this information can be transmitted prior to the vehicle beginning its delivery. This can help to avoid improperly sealed vehicles, which may be refused at the secure location.

At step 704, the computing device can transmit a delivery schedule comprising the indication of the scheduled delivery to a device at the delivery site (e.g., at least one of the one or more second devices 106). In some aspects, the delivery schedule can help to facilitate staffing of one or more sites within the secured area, based on deliveries scheduled to each of the one or more sites.

At step 706, the computing device can receive a delivery update adjusting one or more of the delivery parameters. The update can be received, for example, from a device associated with the delivery vehicle and/or the delivery driver (e.g., the third device 108). In an aspect, the delivery update can comprise an updated estimated delivery time. For example, the updated estimated delivery time can be received from the third device based at least in part on location information of the third device and/or drive time estimates from the delivery driver.

At step 708, the computing device can update the delivery schedule based on the delivery update received at step 706. For example, a new estimated delivery time can be received, and the delivery schedule can be revised to reflect the new delivery time. In some aspects, the device at the delivery site can display the updated delivery schedule in response to receiving the updated delivery schedule.

At step 710, the computing device can cause one or more security actions to be performed on a delivery vehicle based at least in part on the updated delivery schedule and the arrival of the delivery vehicle. In some aspects, the one or more security actions can be determined based on one or more tamper indicating devices on the delivery vehicle matching the information regarding the one or more tamper indicating devices received as part of the delivery schedule (e.g., in the delivery parameters).

In some aspects, causing the one or more security actions to be performed can comprise completing a checklist of activities mandated by the secure location. For example, the computing device can cause the device at the secure location to output indicia of the one or more security actions. The indicia can comprise visual and/or auditory cues for a trained officer, directing the officer in completion of the one or more security actions. As a particular example, the checklist can comprise a list of activities that satisfy regulations such as 10 CFR 73.55, Nuclear Regulatory Commission guidelines, internal guidelines, and/or the like. In some aspects, the trained officer can indicate that the one of the one or more security actions are being performed by circling an indicia on the display of the device located at the secure location, altering a color of a font in which the indicia is displayed, or otherwise highlighting the one of the one or more security actions. When the one of the one or more security actions are completed, the trained officer can indicate as much by drawing a line through the one or more security actions, drawing a line through another indication (e.g., drawing a line through a circled security action), combinations thereof, and the like.

In some aspects, in response to performance of the one or more security actions, the device at the secure location (e.g., the one or more second devices 106) can transmit an indication that one or more security actions have been performed on the delivery vehicle to one or more additional devices (e.g., others of the one or more second devices 106). For example, the device at the secure location can transmit vehicle information and information regarding completed search procedures to additional devices at checkpoints through which the delivery vehicle will cross and/or final delivery sites for the delivery vehicle.

Figure 8:
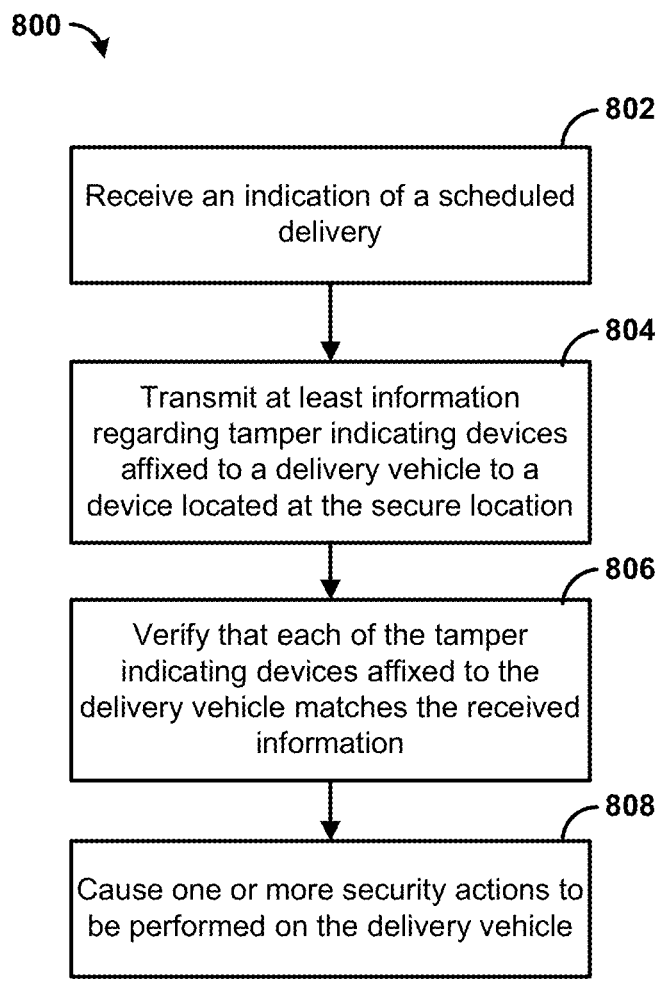
FIG. 8 is a flowchart of an example method.

FIG. 8 illustrates another method 800 for improving vehicle search. At step 802, a computing device (e.g., the central computer 110) can receive an indication of a scheduled delivery. In some aspects, the indication of the scheduled delivery can be received from a device at a location remote from the secure area (e.g., the first device 102). The indication of the scheduled delivery can comprise information regarding one or more tamper indicating devices affixed to a delivery vehicle. In some aspects, the indication of the scheduled delivery can further comprise information related to the scheduled delivery, such as a scheduled delivery time, information regarding a scheduled delivery vehicle, information regarding a scheduled delivery driver, information regarding a delivery work order, one or more photos of a delivery vehicle, or one or more photos of cargo to be delivered.

In some aspects, the computing device can transmit, to the device used to seal the delivery vehicle and/or its cargo, one or more guidelines for use in sealing the delivery vehicle and/or its cargo. For example, this information can be transmitted prior to the vehicle beginning its delivery. This can help to avoid improperly sealed vehicles, which may be refused at the secure location.

At step 804, the computing device can transmit at least the information regarding the one or more tamper indicating devices affixed to the delivery vehicle. The computing device can transmit the information regarding the one or more tamper indicating devices to a device located at the secure location (e.g., at least one of the one or more second devices 106). In some aspects, the information regarding the one or more tamper indicating devices affixed to the delivery vehicle can comprise one or more identification numbers associated with the one or more tamper indicating devices. The information can comprise one or more photographs of the one or more tamper indicating devices.

At step 806, the computing device can cause verification that each of the tamper indicating devices affixed to the delivery vehicle matches the received information regarding the one or more tamper indicating devices affixed to the delivery vehicle.

At step 808, the computing device can cause one or more security actions to be performed on the delivery vehicle based at least in part on verifying that each of the tamper indicating devices affixed to the delivery vehicle matches the received information regarding the one or more tamper indicating devices affixed to the delivery vehicle.

In some aspects, the computing device can receive an indication that one of the one or more security actions is being performed. The indication can comprise any indicia that would indicate that the one of the one or more security actions in process, such as activation of a user interface element, interaction with a button on the device, reception of a voice command via a microphone, and/or the like. In some aspects, the indication that the one of the one or more security actions is being performed can be represented by circling the indicia on the display of the device located at the secure location, altering a color of the font in which the indicia is displayed, or otherwise highlighting the one of the one or more security actions.

The computing device can optionally receive an indication that the one of the one or more security actions is complete. In some aspects, the indication that the one of the one or more security actions is complete can be received from the device at the secure location. The indication that the one of the one or more security actions is complete can comprise any indicia that would indicate that the one of the one or more security actions is complete, such as activation of a user interface element, interaction with a button on the device, reception of a voice command via a microphone, and/or the like. In some aspects, the indication that the one of the one or more security actions is complete can be represented by slashing or otherwise crossing out indicia on the display, altering a color of the font in which the indicia is displayed, or otherwise highlighting the first security action.

In some aspects, causing the one or more security actions to be performed can comprise completing a checklist of activities mandated by the secure location. For example, the computing device can cause the device at the secure location to output indicia of the one or more security actions. The indicia can comprise visual and/or auditory cues for a trained officer, directing the officer in completion of the one or more security actions. As a particular example, the checklist can comprise a list of activities that satisfy regulations such as 10 CFR 73.55, Nuclear Regulatory Commission guidelines, internal guidelines, and/or the like.

In some aspects, in response to performance of the one or more security actions, the device at the secure location (e.g., the second device) can transmit an indication that one or more security actions have been performed on the delivery vehicle to one or more additional devices (e.g., others of the one or more second devices). For example, the device at the secure location can transmit vehicle information and information regarding completed search procedures to additional devices at checkpoints through which the delivery vehicle will cross and/or final delivery sites for the delivery vehicle.

In some aspects, the computing device can create a delivery schedule comprising the indication of the scheduled delivery to a device at the delivery site (e.g., at least one of the one or more second devices 102). The delivery schedule can be based on the received scheduled delivery time. In some aspects, the delivery schedule can help to facilitate staffing of one or more sites within the secured area, based on deliveries scheduled to each of the one or more sites. The delivery schedule can further be transmitted to the device at the secure location.

The computing device can receive a delivery update adjusting one or more of the delivery parameters. The update can be received, for example, from a device associated with the delivery vehicle and/or the delivery driver (e.g., the third device 108). In an aspect, the delivery update can comprise an updated estimated delivery time. For example, the updated estimated delivery time can be received from the third device based at least in part on location information of the third device and/or drive time estimates from the delivery driver.

The computing device can update the delivery schedule based on the received delivery update. For example, a new estimated delivery time can be received, and the delivery schedule can be revised to reflect the new delivery time. In some aspects, the computing device can transmit the updated delivery schedule to the device at the delivery site, so that the updated delivery schedule can be displayed. For example, the updated delivery schedule can be transmitted in response to receiving the updated delivery schedule.

Figure 9:
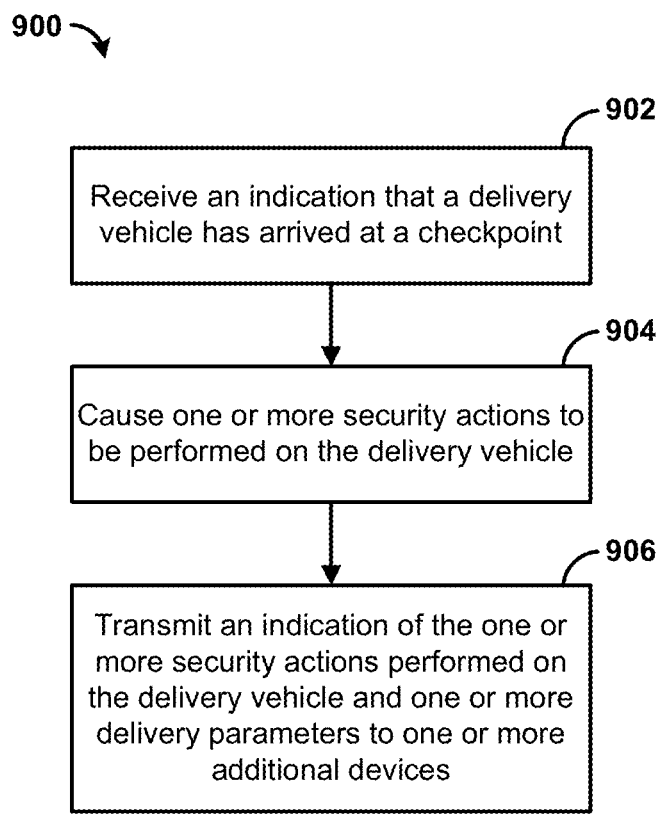
FIG. 9 is a flowchart of an example method.

FIG. 9 illustrates another method 900 for improving vehicle search. At step 902, a device located at a site within a secure area (e.g., one of the one or more second devices 106) can receive an indication that a delivery vehicle has arrived at a checkpoint. The indication can comprise, for example, a trained security officer pressing a button to indicate arrival of the delivery vehicle at the site. In some aspects, the device located at the secure location can transmit the indication to a computing device (e.g., the central computer 110).

At step 904, one or more security actions can be cause to be performed on the delivery vehicle. In some aspects, the device located at the site within the secure area can cause the security actions to be performed in response to the indication that the delivery vehicle has arrived. In some aspects, causing the one or more security actions to be performed can comprise completing a checklist of activities mandated by the secure location. For example, the computing device can cause the device at the secure location to output indicia of the one or more security actions. The indicia can comprise visual and/or auditory cues for a trained officer, directing the officer in completion of the one or more security actions. As a particular example, the checklist can comprise a list of activities that satisfy regulations such as 10 CFR 73.55, Nuclear Regulatory Commission guidelines, internal guidelines, and/or the like.

At step 906, the device located at the site within the secure area can transmit an indication of the one or more security actions performed on the delivery vehicle and one or more delivery parameters. In some aspects, the indication of the one or more security actions and the one or more delivery parameters can be transmitted to one or more additional devices located at the secure area. For example, the devices can be additional devices in the secure area based on checkpoints through which the delivery vehicle will pass and/or a final delivery site for the delivery vehicle.

In some aspects, the computing device can receive an indication that one of the one or more security actions is being performed. The indication can comprise any indicia that would indicate that the one of the one or more security actions in process, such as activation of a user interface element, interaction with a button on the device, reception of a voice command via a microphone, and/or the like. In some aspects, the indication that the one of the one or more security actions is being performed can be represented by circling the indicia on the display of the device located at the secure location, altering a color of the font in which the indicia is displayed, or otherwise highlighting the one of the one or more security actions.

The computing device can optionally receive an indication that the one of the one or more security actions is complete. In some aspects, the indication that the one of the one or more security actions is complete can be received from the device at the secure location. The indication that the one of the one or more security actions is complete can comprise any indicia that would indicate that the one of the one or more security actions is complete, such as activation of a user interface element, interaction with a button on the device, reception of a voice command via a microphone, and/or the like. In some aspects, the indication that the one of the one or more security actions is complete can be represented by slashing or otherwise crossing out indicia on the display, altering a color of the font in which the indicia is displayed, or otherwise highlighting the first security action.

In some aspects, the delivery parameters can comprise information related to the scheduled delivery. As non-limiting examples, the one or more delivery parameters can comprise an arrival time, information regarding the delivery vehicle, information regarding a destination of the delivery vehicle, information regarding a delivery driver, information regarding a delivery work order, one or more photos of a delivery vehicle, or one or more photos of cargo to be delivered. The one or more delivery parameters can comprise information regarding one or more tamper indicating devices installed on a delivery vehicle.

In some aspects, causing the one or more security actions to be performed can comprise completing a checklist of activities mandated by the secure location. For example, the computing device can cause the device at the secure location to output indicia of the one or more security actions. The indicia can comprise visual and/or auditory cues for a trained officer, directing the officer in completion of the one or more security actions. As a particular example, the checklist can comprise a list of activities that satisfy regulations such as 10 CFR 73.55, Nuclear Regulatory Commission guidelines, internal guidelines, and/or the like.

Figure 10:
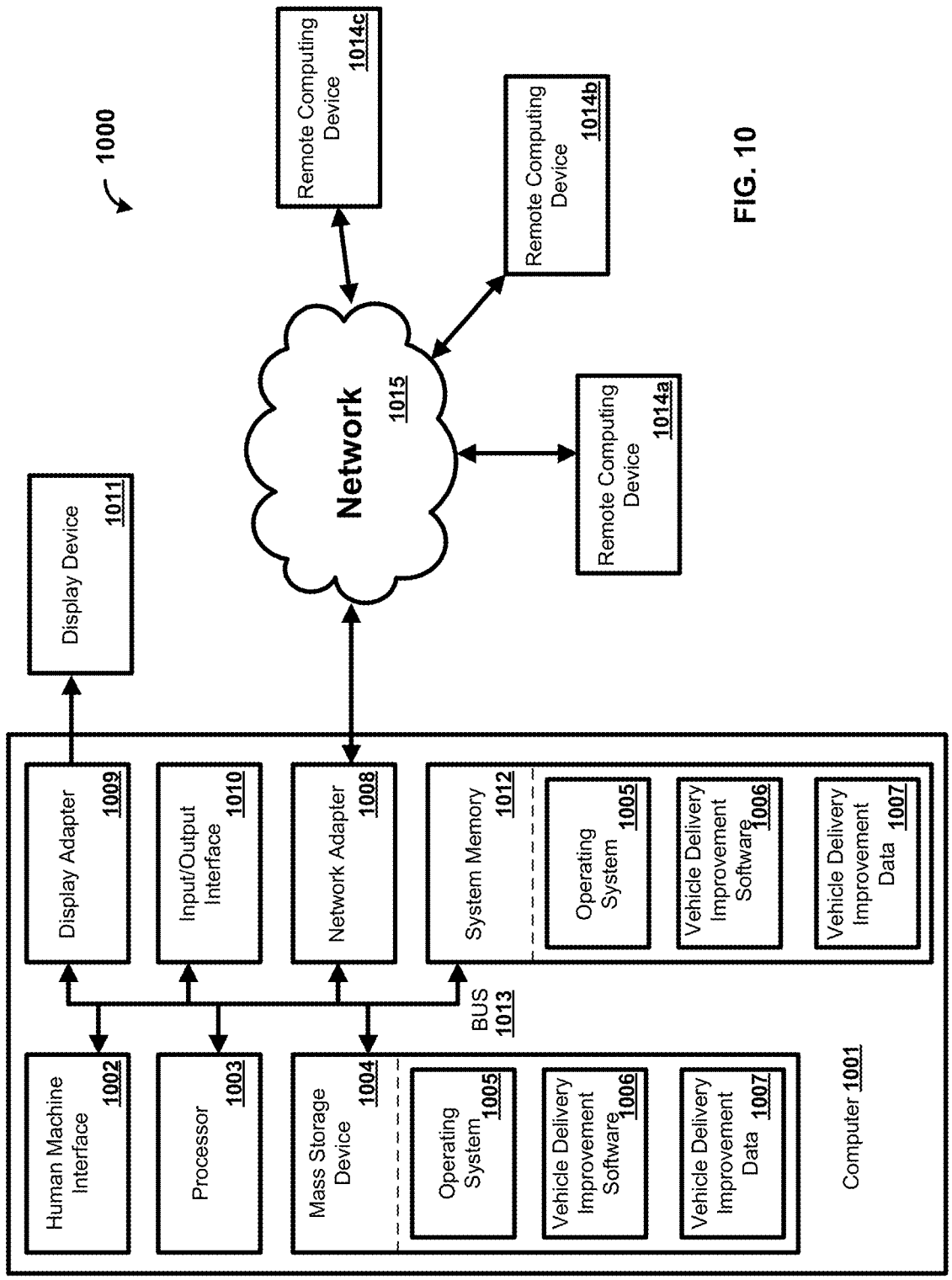
FIG. 10 is a block diagram of an example operating environment.

In an exemplary aspect, the methods and systems can be implemented on a computer 1001 as illustrated in FIG. 10 and described below. By way of example, server 1010 of FIG. 10 can be a computer 1001 as illustrated in FIG. 10. Similarly, the methods and systems disclosed can utilize one or more computers to perform one or more functions in one or more locations. FIG. 10 is a block diagram illustrating an exemplary operating environment 1000 for performing the disclosed methods. This exemplary operating environment 1000 is only an example of an operating environment and is not intended to suggest any limitation as to the scope of use or functionality of operating environment architecture. Neither should the operating environment 1000 be interpreted as having any dependency or requirement relating to any one or combination of components illustrated in the exemplary operating environment 1000.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 1001. The computer 1001 can comprise one or more components, such as one or more processors 1003, a system memory 1012, and a bus 1013 that couples various components of the computer 1001 including the one or more processors 1003 to the system memory 1012. In the case of multiple processors 1003, the system can utilize parallel computing.

The bus 1013 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description can also be implemented over a wired or wireless network connection and one or more of the components of the computer 1001, such as the one or more processors 1003, a mass storage device 1004, an operating system 1005, vehicle delivery improvement software 1006, vehicle delivery improvement data 1007, a network adapter 1008, system memory 1012, an Input/Output Interface 1010, a display adapter 1009, a display device 1011, and a human machine interface 1002, can be contained within one or more remote computing devices 1014a,b,c at physically separate locations, connected through buses of this form, in effect implementing a fully distributed system.

The computer 1001 typically comprises a variety of computer readable media. Exemplary readable media can be any available media that is accessible by the computer 1001 and comprises, for example and not meant to be limiting, both volatile and non-volatile media, removable and non-removable media. The system memory 1012 can comprise computer readable media in the form of volatile memory, such as random access memory (RAM), and/or non-volatile memory, such as read only memory (ROM). The system memory 1012 typically can comprise data such as vehicle delivery improvement data 1007 and/or program modules such as operating system 1005 and vehicle delivery improvement software 1006 that are accessible to and/or are operated on by the one or more processors 1003.

In another aspect, the computer 1001 can also comprise other removable/non-removable, volatile/non-volatile computer storage media. The mass storage device 1004 can provide non-volatile storage of computer code, computer readable instructions, data structures, program modules, and other data for the computer 1001. For example, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including by way of example, an operating system 1005 and vehicle delivery improvement software 1006. One or more of the operating system 1005 and vehicle delivery improvement software 1006 (or some combination thereof) can comprise elements of the programming and the vehicle delivery improvement software 1006. Vehicle delivery improvement data 1007 can also be stored on the mass storage device 1004. Vehicle delivery improvement data 1007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 1015.

In another aspect, the user can enter commands and information into the computer 1001 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 1003 via a human machine interface 1002 that is coupled to the bus 1013, but can be connected by other interface and bus structures, such as a parallel port, game port, an IEEE 1394 Port (also known as a Firewire port), a serial port, network adapter 1008, and/or a universal serial bus (USB).

In yet another aspect, a display device 1011 can also be connected to the bus 1013 via an interface, such as a display adapter 1009. It is contemplated that the computer 1001 can have more than one display adapter 1009 and the computer 1001 can have more than one display device 1011. For example, a display device 1011 can be a monitor, an LCD (Liquid Crystal Display), light emitting diode (LED) display, television, smart lens, smart glass, and/or a projector. In addition to the display device 1011, other output peripheral devices can comprise components such as speakers (not shown) and a printer (not shown) which can be connected to the computer 1001 via Input/Output Interface 1010. Any step and/or result of the methods can be output in any form to an output device. Such output can be any form of visual representation, including, but not limited to, textual, graphical, animation, audio, tactile, and the like. The display 1011 and computer 1001 can be part of one device, or separate devices.

The computer 1001 can operate in a networked environment using logical connections to one or more remote computing devices 1014a,b,c. By way of example, a remote computing device 1014a,b,c can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1001 and a remote computing device 1014a,b,c can be made via a network 1015, such as a local area network (LAN) and/or a general wide area network (WAN). Such network connections can be through a network adapter 1008. A network adapter 1008 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1005 are illustrated herein as discrete blocks, although it is recognized that such programs and components can reside at various times in different storage components of the computing device 1001, and are executed by the one or more processors 1003 of the computer 1001. An implementation of vehicle delivery improvement software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, from a first device, an indication of a scheduled delivery, wherein the indication of the scheduled delivery comprises one or more delivery parameters;
   sending, to a second device, a delivery schedule comprising the indication of the scheduled delivery;
   receiving, from a third device, based on location information of the third device and one or more beacon devices communicating with one or more access points along a route of a vehicle and based on one or more estimated drive times associated with the vehicle associated with the third device, a delivery update adjusting at least one of the one or more delivery parameters, wherein the third device determines the one or more estimated drive times based on location information received via a Global Positioning System (GPS) sensor of the third device;
   receiving, from the second device, one or more images comprising the vehicle or cargo to be delivered captured by a camera of the second device;
   updating, based on the delivery update, the delivery schedule;
   determining status information associated with the updated delivery schedule, wherein the status information comprises an estimated arrival time of the vehicle at one or more locations based on the status information, indicia of one or more security actions, and one or more indicators associated with the vehicle;
   generating an augmented reality overlay comprising the status information, a first interface element that is configured to cause a visual interface to swap between the augmented reality overlay and a scanner based on an interaction with the first interface element, and a second interface element that is configured to cause the one or more security actions to be performed based on an interaction with the second interface element;
   generating, based on combining the one or more images with the augmented reality overlay, a visual interface;
   sending, to the second device, the visual interface, wherein the second device displays the visual interface; and
   causing, based on the updated delivery schedule and one or more tamper indicating devices associated with the one or more delivery parameters, the one or more security actions to be performed on the vehicle.

2. The method of claim 1, wherein the one or more delivery parameters comprise one or more of a scheduled delivery time, information regarding the vehicle, information regarding a scheduled delivery driver, or information regarding a delivery work order.

3. The method of claim 1, wherein the one or more delivery parameters comprise information regarding the one or more tamper indicating devices installed on the vehicle.

4. The method of claim 3, wherein the one or more security actions are based on the one or more tamper indicating devices on the vehicle matching the information regarding the one or more tamper indicating devices.

5. The method of claim 1, further comprising transmitting, to the first device, one or more security guidelines for securing cargo prior to delivery, wherein the one or more security guidelines are related to the one or more security actions.

6. The method of claim 1, wherein causing the one or more security actions to be performed comprises causing the second device to output, via the visual interface, indicia of the one or more security actions.

7. The method of claim 6, wherein the indicia of the one or more security actions comprise instructions for performing a search according to Nuclear Regulatory Commission guidelines.

8. The method of claim 1, further comprises sending, from the second device to one or more additional devices, an indication that the one or more security actions have been performed on the vehicle.

9. The method of claim 1, wherein the one or more delivery parameters comprises an estimated delivery time, and wherein receiving, from the third device, the delivery update adjusting at least one of the one or more delivery parameters comprises receiving an updated estimated delivery time based at least in part on the location information of the third device.

10. The method of claim 1, further comprising causing the second device to display, via the visual interface, the updated delivery schedule.

11. An apparatus, comprising:
    one or more processors; and
    a memory having embodied thereon processor executable instructions that, when executed by the one or more processors, cause the apparatus to:
    receive, from a first device, an indication of a scheduled delivery, wherein the indication of the scheduled delivery comprises one or more delivery parameters;

send, to a second device, a delivery schedule comprising the indication of the scheduled delivery;

receive, from a third device, based on location information of the third device and one or more beacon devices communicating with one or more access points along a route of a vehicle and based on one or more estimated drive times associated with the vehicle associated with the third device, a delivery update adjusting at least one of the one or more delivery parameters, wherein the third device determines the one or more estimated drive times based on location information received via a Global Positioning System (GPS) sensor of the third device;

receive, from the second device, one or more images comprising the vehicle or cargo to be delivered captured by a camera of the second device;

update, based on the delivery update, the delivery schedule;

determine status information associated with the updated delivery schedule, wherein the status information comprises an estimated arrival time of the vehicle at one or more locations based on the status information, indicia of one or more security actions, and one or more indicators associated with the vehicle;

generate an augmented reality overlay comprising the status information, a first interface element that is configured to cause a visual interface to swap between the augmented reality overlay and a scanner based on an interaction with the first interface element and a second interface element that is configured to cause the one or more security actions to be performed based on an interaction with the second interface element;

generate, based on combining the one or more images with the augmented reality overlay, a visual interface;

send, to the second device, the visual interface, wherein the second device displays the visual interface; and cause, based on the updated delivery schedule and one or more tamper indicating devices associated with the one or more delivery parameters, the one or more security actions to be performed on the vehicle.

12. A method comprising:

receiving, from a first device, an indication of a scheduled delivery, wherein the indication of the scheduled delivery comprises one or more delivery parameters;

sending, to a second device, a delivery schedule comprising the indication of the scheduled delivery;

receiving, from a third device, based on location information of the third device and one or more beacon devices communicating with one or more access points along a route of a vehicle and based on one or more estimated drive times associated with the vehicle associated with the third device, a delivery update adjusting at least one of the one or more delivery parameters, wherein the third device determines the one or more estimated drive times based on location information received via a Global Positioning System (GPS) sensor of the third device;

receiving, from the second device, one or more images comprising the vehicle or cargo to be delivered captured by a camera of the second device;

updating, based on the delivery update, the delivery schedule;

determining status information associated with the updated delivery schedule, wherein the status information comprises an estimated arrival time of the vehicle at one or more locations based on the status information, indicia of one or more security actions, and one or more indicators associated with the vehicle;

generating an augmented reality overlay comprising the status information, a first interface element that is configured to cause a visual interface to swap between the augmented reality overlay and a scanner based on an interaction with the first interface element and a second interface element that is configured to cause the one or more security actions to be performed based on an interaction with the second interface element;

generating, based on combining the one or more images with the augmented reality overlay, a visual interface;

sending, to the second device, the visual interface, wherein the second device displays the visual interface;

causing, based on the updated delivery schedule and one or more tamper indicating devices associated with the one or more delivery parameters, the second device to output, via the visual interface, indicia of the one or more security actions;

causing the second device to emphasize the indicia of the one or more security actions; and causing, based on the indicia and based on the updated delivery schedule, the one or more security actions to be performed on the vehicle.

13. The method of claim 12, wherein the one or more delivery parameters comprise one or more of a scheduled delivery time, information regarding the vehicle, information regarding a scheduled delivery driver, or information regarding a delivery work order.

14. The method of claim 12, wherein, based on an interaction with the second interface element, the one or more security actions are caused to be performed.

15. The method of claim 12, wherein the second device is caused to emphasize, via the visual interface, the indicia by one or more of:
circling the indicia;
altering a color of the indicia; or
highlighting the indicia.

16. The method of claim 12, wherein the one or more delivery parameters comprise information regarding the one or more tamper indicating devices installed on the vehicle.

17. The method of claim 16, wherein the one or more security actions are based on the one or more tamper indicating devices on the vehicle matching the information regarding the one or more tamper indicating devices.

18. The method of claim 12, wherein the indicia of the one or more security actions comprise instructions for performing a search according to Nuclear Regulatory Commission guidelines.

19. The method of claim 12, further comprises transmitting, from the second device to one or more additional devices, an indication that the one or more security actions have been performed on the vehicle.

* * * * *